United States Patent [19]
Sai et al.

[11] Patent Number: 5,691,494
[45] Date of Patent: Nov. 25, 1997

[54] CENTRALIZED SYSTEM PROVIDING KARAOKE SERVICE AND EXTRANEOUS SERVICE TO TERMINALS

[75] Inventors: Tom Jen Sai; Hirokazu Kato, both of Hamamatsu, Japan

[73] Assignee: Yamaha Corporation, Hamamatsu, Japan

[21] Appl. No.: 537,134

[22] Filed: Sep. 29, 1995

[30] Foreign Application Priority Data

Oct. 14, 1994 [JP] Japan ............................ 6-249454

[51] Int. Cl.⁶ .......................... G09B 5/00; G10H 1/26
[52] U.S. Cl. .......................... 84/609; 434/307 A
[58] Field of Search .................. 84/601, 602, 609–614, 84/634–638, 645, 477 R, 478; 434/307 A

[56] References Cited

U.S. PATENT DOCUMENTS 5,532,923  7/1996  Sone ........................ 84/602 X

FOREIGN PATENT DOCUMENTS

| | | |
|---|---|---|
| 6067682 | 3/1994 | Japan . |
| 2235800 | 3/1991 | United Kingdom . |
| 2281434 | 3/1995 | United Kingdom . |
| 2281485 | 3/1995 | United Kingdom . |

*Primary Examiner*—Stanley J. Witkowski
*Attorney, Agent, or Firm*—Loeb & Loeb LLP

[57] ABSTRACT

A Karaoke apparatus, a host apparatus and a management apparatus are interconnected to each other through a communication line to constitute a centralized system. The host apparatus receives an entry code requesting a Karaoke service of a desired song from the Karaoke apparatus through the communication line for supplying a music data of the desired song. The management apparatus receives an order code requesting an additional service other than the Karaoke service from the Karaoke apparatus through the communication line for attending to the order code and returning a response message. The Karaoke apparatus is equipped with an input tool having a primary use for inputting the entry code and a secondary use for inputting the order code. A transmitter distributes the inputted entry code to the host apparatus and distributes the inputted order code to the management apparatus. A receiver receives the music data from the host apparatus and receives the response message from the management apparatus. A player is operated for reproducing the desired song according to the received music data to thereby provide the Karaoke service, and a display is operated for displaying the received response message to thereby indicate how the additional service is managed.

10 Claims, 8 Drawing Sheets

CENTRALIZED SYSTEM PROVIDING KARAOKE SERVICE AND EXTRANEOUS SERVICE TO TERMINALS

BACKGROUND OF THE INVENTION

The present invention relates to a Karaoke apparatus (i.e., sing-along apparatus) connected to a host apparatus through a high-speed communication channel, and relates to a communication Karaoke system of the centralized type in which the host apparatus supplies a plurality of karaoke apparatuses with requested music data. More particularly, the present invention relates to efficient use of the communication channel provided in the Karaoke system.

Recent Karaoke business creates a commercial karaoke facility having a plurality of small individual rooms or compartments (each called "Karaoke box") provided therein with Karaoke apparatuses. Such a public facility is called "Karaoke Box house". The Karaoke Box house installs a plurality of Karaoke apparatuses in the respective boxes. The conventional Karaoke apparatus of stand-alone type, however, has an economical disadvantage of requiring a mass storage device for reserving music data of several hundreds to several thousands of Karaoke music songs. There is another Karaoke apparatus of on-line type constructed to receive music data from an external database by on-line. However, it takes a considerable long time to download desired Karaoke music data by on-line. The Karaoke Box house, therefore, tends to adopt a centralized type communication Karaoke system in which the Karaoke apparatuses in the respective rooms are connected through an internal communication channel to a host apparatus installed in the Karaoke Box house. In such a centralized type communication Karaoke system, each Karaoke apparatus transmits a request message to the host apparatus for requesting download of the desired music data from the host apparatus.

In the above communication Karaoke system, data transmission between the host apparatus and the Karaoke apparatus needs to be performed at high speed since it cannot take a long waiting time after a request is issued from one of the Karaoke apparatuses until the Karaoke performance is actually started. For this reason, the Karaoke apparatuses are connected to the host apparatus through a coaxial cable used in CATV. One channel of CATV can be used for the data transmission to download the music data at a transmission speed of 6 Mbps. Such a high-speed communication installment, however, suffers from disadvantage of less cost efficiency in spite of high performance, such that the Karaoke apparatus and the communication line are placed in an idle state at any time other than a transfer time since the data transmission can be finished just in several seconds. On the other hand, the Karaoke Box house typically serves some drink and food, and an employee of the house generally receives a customer's order through a separate line such as interphones or extension telephones.

SUMMARY OF THE INVENTION

In view of the drawbacks of the prior art, an object of the present invention is to provide a Karaoke apparatus and a Karaoke system which can effectively utilize an idle time of a communication channel provided between the Karaoke apparatus and a host apparatus to efficiently receive customer's order in addition to regular song requests.

In one aspect of the present invention, there is provided a Karaoke apparatus connected to a host apparatus and a management apparatus through a communication line. The apparatus comprises input means having a primary use for inputting an entry code effective to request a Karaoke service of a desired song, and having a secondary use for inputting an order code effective to request an additional service other than the Karaoke service, transmitter means for transmitting the inputted entry code to the host apparatus through the communication line so that the host apparatus supplies a music data of the desired song, and for transmitting the inputted order code to the management apparatus through the same communication line so that the management apparatus attends to the order code and returns a response message, receiver means for receiving the music data and the response message through the same communication line, player means for reproducing the desired song according to the received music data to thereby provide the Karaoke service, and display means for displaying the received response message to thereby indicate how the additional service is managed.

In another aspect of the present invention, there is provided a centralized system comprising a Karaoke apparatus, a host apparatus and a management apparatus, which are interconnected to each other through a communication line. The host apparatus comprises means receptive of an entry code requesting a Karaoke service of a desired song from the Karaoke apparatus through the communication line for supplying a music data of the desired song. The management apparatus comprises means receptive of an order code requesting an additional service other than the Karaoke service from the Karaoke apparatus through the communication line for attending to the order code and returning a response message. The Karaoke apparatus comprises input means having a primary use for inputting the entry code and a secondary use for inputting the order code, transmitter means for distributing the inputted entry code to the host apparatus and distributing the inputted order code to the management apparatus, receiver means for receiving the music data from the host apparatus and receiving the response message from the management apparatus, player means for reproducing the desired song according to the received music data to thereby provide the Karaoke service, and display means for displaying the received response message to thereby indicate how the additional service is managed.

According to the present invention, the host apparatus stores vast items of music data. When a song request occurs at a Karaoke apparatus, i.e., when an entry code is inputted, the Karaoke apparatus converts the entry code into an electric signal which is transmitted to the host apparatus. The host apparatus searches its database for the music data corresponding to the inputted entry code, and then downloads the music data to the Karaoke apparatus, thereby providing the Karaoke music service just as requested by a customer. The present invention features the management apparatus connected to the common communication line used in downloading of the music data. The order code input means is installed in the Karaoke apparatus for inputting the order code to the management apparatus. The order code can be issued, for example, to order drink or food, or to buy a ticket announced in a commercial program which is supplied from the host apparatus and displayed in the Karaoke apparatus during an idling time. The Karaoke apparatus converts the inputted order code into an electric signal which is transmitted to the management apparatus. Further, the Karaoke apparatus receives a response message from the management apparatus. The management apparatus performs a predetermined operation based upon the order message received from the Karaoke apparatus. The predetermined operation includes displaying the order details on a display or placing a ticket purchase order to an external agent by on-line. This makes it possible to communicate between a guest customer and a host manager while utilizing the idle time of the communication line, and further to realize interactive communication between the customer and the manager through the centralized system installed in the Karaoke house. Moreover, various transactions can be realized by on-line data transfer within the Karaoke house.

DETAILED DESCRIPTION OF THE INVENTION

Figure 1:
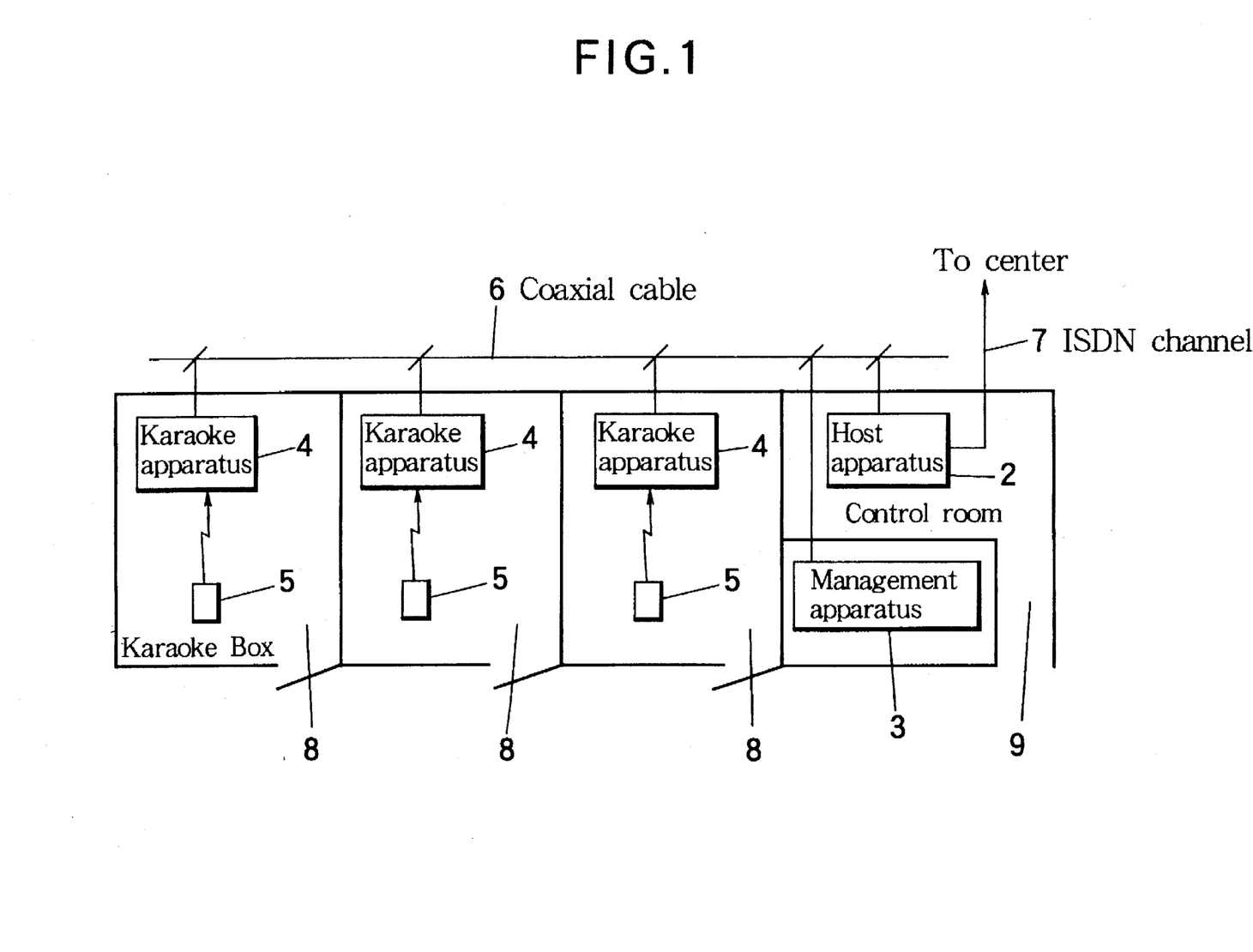
FIG. 1 is a schematic block diagram of a communication Karaoke system according to an embodiment of the present invention.
Figure 2:
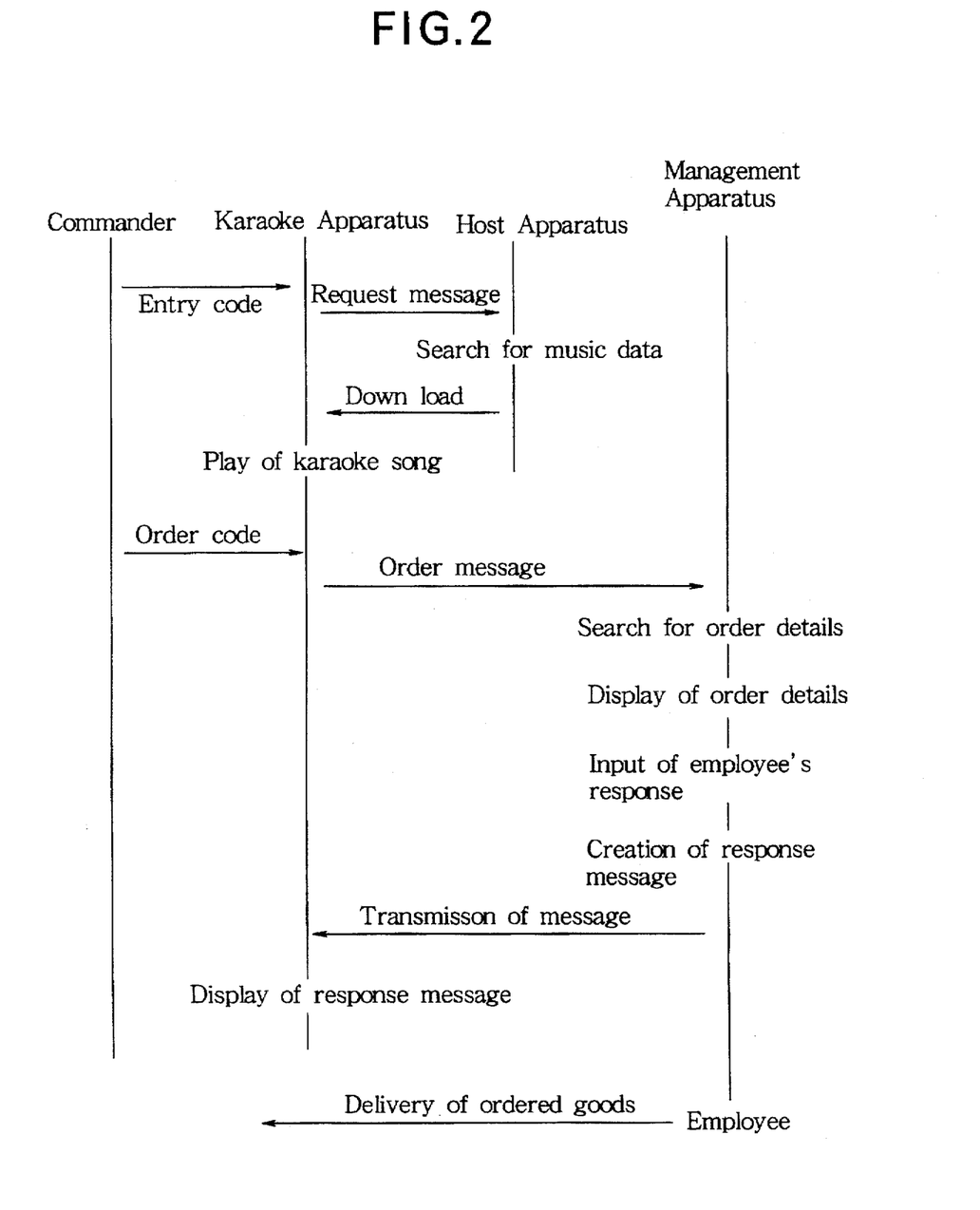
FIG. 2 is a diagram illustrating communication sequence of the communication Karaoke system shown in FIG. 1.

FIG. 1 shows a schematic configuration of a communication Karaoke system according to an embodiment of the present invention. FIG. 2 illustrates data send/receive sequence of the communication Karaoke system of FIG. 1. The inventive Karaoke system may be set up in a so-called Karaoke Box house. Such a facility has a control room 9 with a counter, and a plurality of Karaoke Boxes (compartments) 8. A host apparatus 2 and a management apparatus 3 are placed in the control room 9, while a Karaoke apparatus 4 is located in each Karaoke Box 8. Each of Karaoke apparatuses 4 is provided with a manual input tool in the form of a commander 5 of an infrared remote control type.

The host apparatus 2, the management apparatus 3 and the plurality of the Karaoke apparatuses 4 are interconnected by a coaxial cable 6 to constitute a local area network. The coaxial cable 6 can perform bidirectional data transmission both in a downward direction from the host apparatus 2 and the management apparatus 3 to the Karaoke apparatuses 4, and in a upward direction from the Karaoke apparatuses 4 to the host apparatus 2 and the management apparatus 3 in an approximately 6 MHz frequency range of an UHF band at a high speed of approximately 6 Mbps. The host apparatus 2, the management apparatus 3 and the Karaoke apparatuses 4 are assigned with unique addresses, thereby identifying which apparatuses should communicate with each other by an electric message according to an address contained in the electric message which is formed of data packets.

Referring now to FIG. 2, overall operation of the system will be described. A customer may first operate the commander 5 to set the Karaoke apparatus 4 to either of an entry mode or an order mode. When the user sends a selection code from the commander 5, the Karaoke apparatus then discriminates the selection code as either of an entry code or an order code depending upon the mode set in the Karaoke apparatus. The entry code or music-select code corresponds to a title of a Karaoke song listed up in a Karaoke music book (i.e., a table book of contents), while the order code corresponds to an item of drink or food. The entry code and the order code may be represented by a common numerical coding system. The entry code is inputted to request a Karaoke service of a desired song, while the order code is inputted to request an additional service other than the Karaoke service, such as delivery of food and drink supplemental to the main Karaoke service. The commander has a primary use to input the entry code and a secondary use to input the order code.

When a selection code is inputted in the entry mode, the Karaoke apparatus 4 converts the selection code into an electric message signal containing the entry code, and then transmits the message signal to the host apparatus 2 through the coaxial cable 6. After the host apparatus 2 has received the message signal, a music data corresponding to the desired or requested song is searched in a storage 31 (see FIG. 4) according to the received entry code. The searched music data is transmitted back to the Karaoke apparatus 4. The Karaoke apparatus then stores the music data in a hard disk drive (HDD) 15 (see FIG. 3) and starts to reproduce the requested song according to the music data immediately after the downloading operation of the music data is finished. By such a manner, the Karaoke apparatus and the host apparatus primarily exchange the entry code and the music data with each other through the local area network to provide instant Karaoke service.

On the other hand, when the selection code is inputted from the commander 5 under the order mode, the Karaoke apparatus produces an order message since the selection code is identified as an order code. Then, the order message is sent to the management apparatus 3. The management or control apparatus 3 searches a table 41 of order details (see FIG. 5) according to the order code contained in the received message, and specifies the order item and displays it on a screen of an operation/display panel 42. The order item is, for example, delivery of drink or food served in the Karaoke Box, or purchase of a concert ticket announced in a commercial program broadcasted to each Karaoke Box through the local area network. An employee attends to the order, and thereby the control apparatus 3 creates a response message which indicates how the order is managed by the employee. Then, the control apparatus 3 returns the response message to the Karaoke apparatus 4. The response or answer message includes whether the order has been duly accepted or not accepted because of being out of stock. Then, the Karaoke apparatus receives the answer message and displays the answer details on a monitor 28. The message display may be performed as soon as the answer message has been received, or in an interval of performance of the Karaoke music. If two or more monitors are installed in the Box, then the answer message may be displayed on a monitor other than an exclusive monitor for singer, thus keeping out of the way of the singer. By such a manner, the Karaoke apparatus and the management apparatus secondarily exchange the order code and the response message with each other through the local area network without interrupting the instant Karaoke service.

Figure 5:
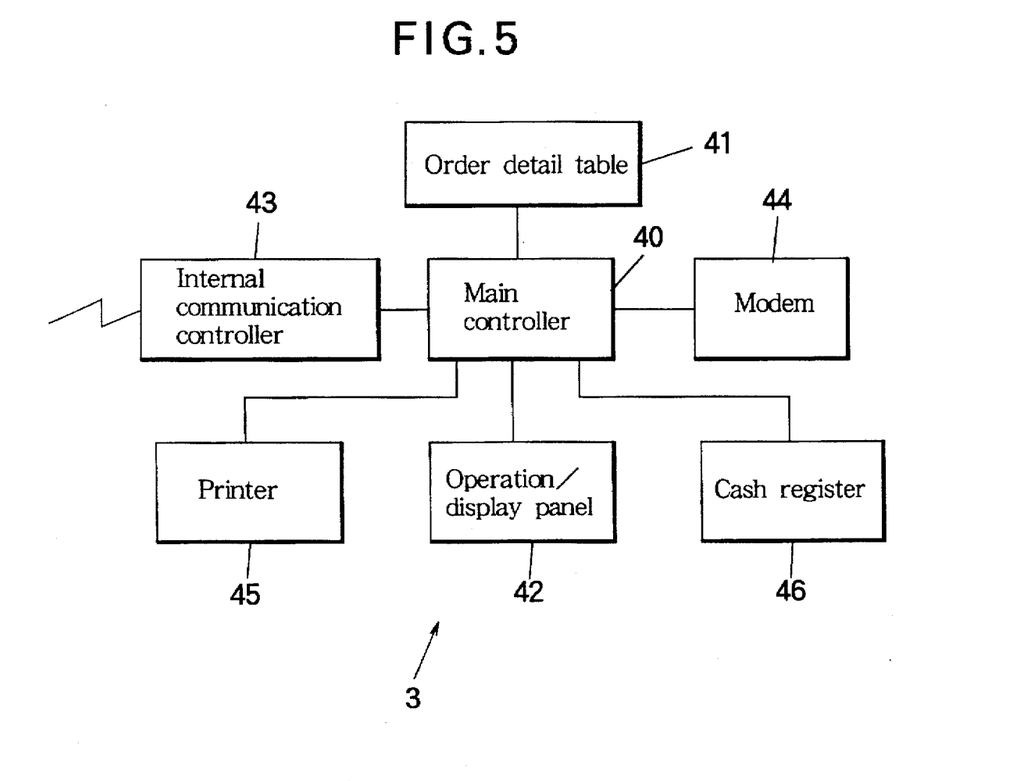
FIG. 5 is a block diagram of a management apparatus involved in the communication Karaoke system.

If the order requests delivery of drink or food, the employee in the control room will deliver the ordered one to the Karaoke Box. Furthermore, when receiving an order for purchase of a concert ticket or the like, the management apparatus 3 may access directly to an external on-line ticket center. Further, the management apparatus 3 produces the purchased ticket by a built-in printing device. The management apparatus 3 also serves as a cash register which can register the order details in a charge account assigned to the corresponding Karaoke Box.

Figure 3:
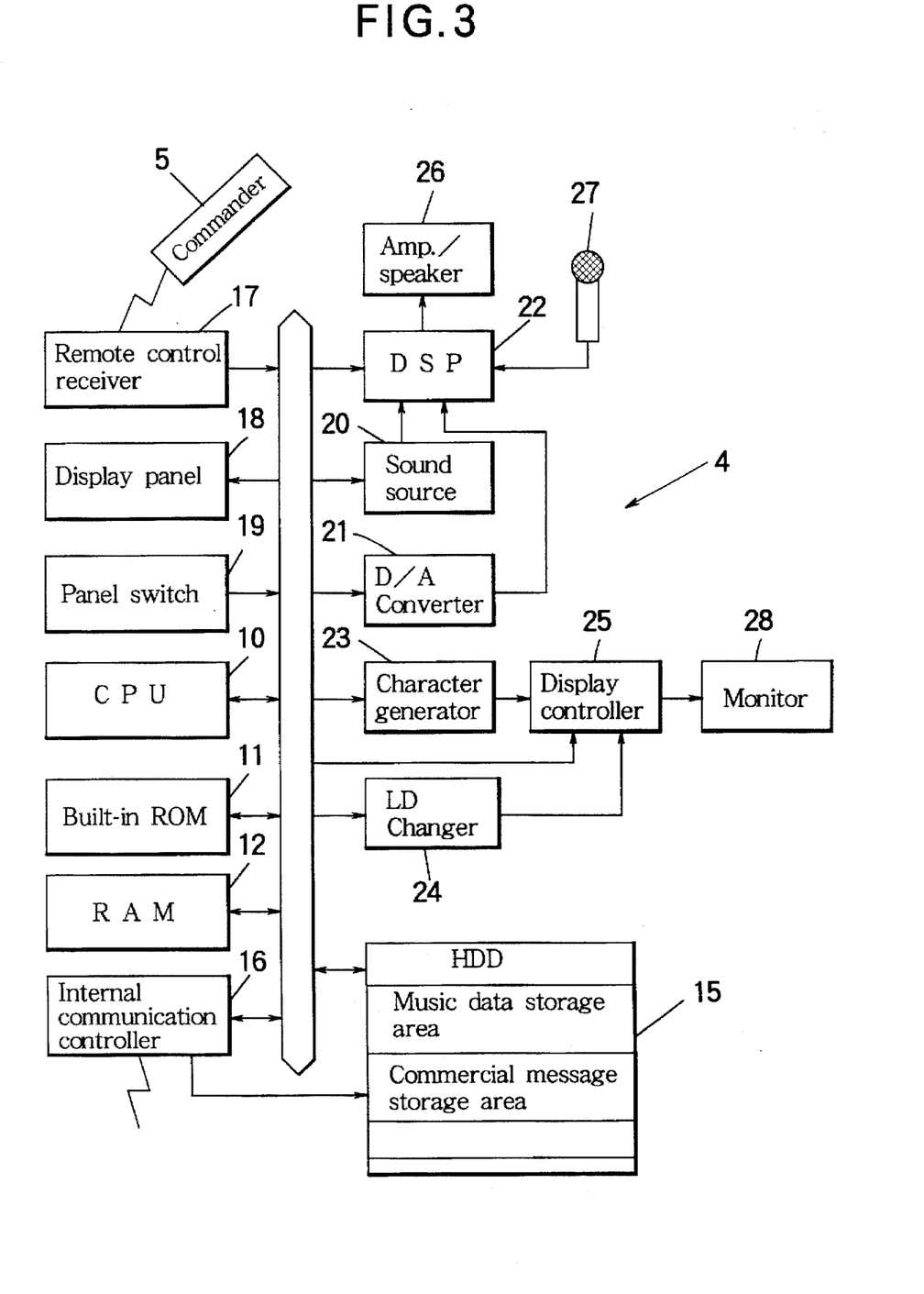
FIG. 3 is a block diagram of a Karaoke apparatus according to an embodiment of the present invention.

Hereinbelow, a structure of each apparatus will be described. FIG. 3 is a block diagram of the Karaoke apparatus 4. This type of the Karaoke apparatus is called a communication type sound source Karaoke apparatus. Such a sound source Karaoke apparatus operates to generate Karaoke sound by actuating a sound source or tone generator according to music data in a sequence format such as MIDI format. The communication type Karaoke apparatus means that the Karaoke apparatus is connected to the host apparatus 2 through the communication link to download the music data from the host apparatus 2.

A CPU 10 controls operation of the entire parts of the Karaoke apparatus. The CPU 10 is connected through a bus to those of a ROM 11, a RAM 12, a hard disk drive (HDD) 15, an internal communication controller 16, a remote control receiver 17, a display panel 18, a panel switch 19, a sound source 20, a D/A converter 21, a DSP 22, a character generator 23, an LD changer 24 and a display controller 25.

The ROM 11 stores a system program, an application program, a loader and font data. The system program is used to control basic operation and data send/receive operation with peripherals. The application program includes, for example, a peripheral control program and a sequence program. At the time of Karaoke playing, the sequence program runs the CPU 10 to reproduce the Karaoke sound and the associated background video based upon the music data. The loader is a kind of program for downloading the music data from the host apparatus 2. The font data represents plural kinds of fonts like a Mincho typeface and a bold typeface such that lyric words or song title of the music can be displayed by means of the font data. The RAM 12 is used to provide a work area of the CPU, while the HDD 15 is used to provide a music data storage area and a commercial message storage area. The music data storage area is used to store the music data of the Karaoke song selected by the commander 5 as described below when the music data is downloaded from the host apparatus 2. The commercial message can be provided from the host apparatus 2 by utilizing an idle time of the communication line.

The internal communication controller 16 is provided with a modem for modulating a message into an electric signal to be transmitted in a predetermined range of the UHF band, and for demodulating the received signal in order to communicate with the host apparatus 2 through the coaxial cable 6. The internal communication controller 16 also contains a DMA circuit which accesses the HDD 15 to directly read the downloaded music data without the help of the CPU 10.

The remote control receiver 17 receives an infrared signal sent from the commander 5 and restores a code contained in the signal. The commander 5 is further provided with a plurality of key switches including a ten-key, an alphabetical keyboard and a send key, and a buffer for storing a sequence of key switch operation. Therefore, when a user inputs a code by operating the ten-key or the alphabetical keyboard in a predetermined sequence and then by turning on the send key, the code inputted to the commander 5 is outputted in the form of the infrared signal which modulated in an FM band.

The transmitted code is, for example, a mode switching command or a selection code. The mode switching command switches over between the entry mode and the order mode. The selection code represents a desired Karaoke song to be replayed or a desired item to be ordered. In addition, the entry code and the order code are prescribed in a music list and an item list (a table of contents) prepared for customers in each Karaoke Box.

The display panel 18 is disposed on the front side of the Karaoke apparatus to display, for example, the entry code currently in progress or the number of reserved music songs. The panel switch 19 is also provided on the front side of the operation portion, and includes a music code input switch and a key changing switch.

The sound source 20 of a synthetic type generates a music signal based upon the music data. The D/A converter 21 receives back chorus voice data of ADPCM form and converts the same into a voice signal. The music signal generated by the sound source and the voice signal fed from the D/A converter are inputted into the DSP 22 to which a microphone 27 is connected to pick up a live singing voice. The DSP 22 then introduces sound effects, such as reverb and echo, to those of the accompaniment music signal, the back chorus voice signal and the singing voice signal inputted from the sound source 20, the D/A converter 21 and the microphone 27, respectively. The type and the degree of the effects added by the DSP 22 are controlled based upon DSP control data contained in the music data. The DSP control data is read out from the music data by the CPU 10 and is fed to the DSP 22. The music signal and the voice signal to which the sound effects have been added are mixed with each other and outputted to an amplifier/speaker 26. The amplifier/speaker 26 amplifies and sounds the mixed signal.

On the other hand, the character generator 23 generates a character pattern of the Karaoke song, such as the title and the words, based upon inputted character data. When the response or answer message has been inputted from the management apparatus 3 in the form of character data, a character pattern based upon the answer message will be generated. The LD changer 24 selects and reproduces a video data determined by a category code or the like of the Karaoke music song and then outputs the video data. After that, the character pattern and the video data are fed to the display controller 25. The display controller 25 composes these data altogether by means of superimpose, and feeds the composite data to the monitor 28.

Figure 4:
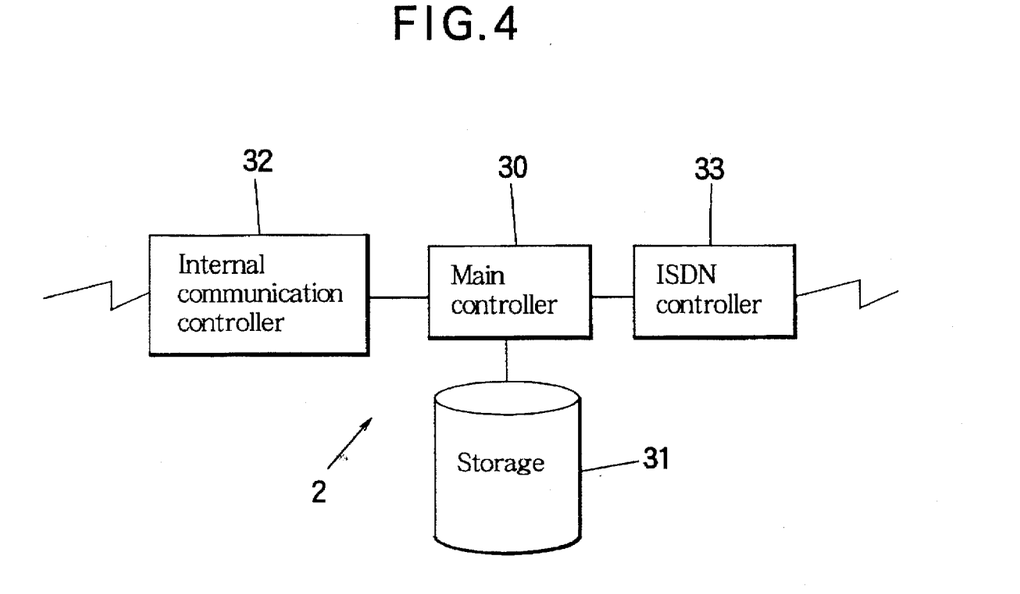
FIG. 4 is a block diagram of a host apparatus involved in the communication Karaoke system.

Next, FIG. 4 is a block diagram of the host apparatus 3. The apparatus is provided with a bulk storage 31 such as a large-capacity hard disk drive capable of storing several thousands of music data and commercial message data. The write/read of the music data in the storage 31 is controlled by a main controller 30. An internal communication controller 32 controls transmission and admission of data to and from each Karaoke apparatus 4 through the coaxial cable 6. In other words, when one of the communication Karaoke apparatuses 4 has transmitted a song request message, the internal communication controller 32 receives the message based upon the destination address, and detects an entry code contained in the message to input the detected code to the main controller 30. The main controller 30 then searches the storage 31 according to the entry code and reads out the corresponding music data. The read-out music data is fed to the internal communication controller 32, in which the music data is converted a block by block into packets and is downloaded to the Karaoke apparatus from which the request command has been issued through the coaxial cable 6.

The host apparatus 2 further includes an ISDN controller 33 connected to a Karaoke data distribution center through an ISDN channel. The Karaoke data distribution center periodically distributes newly released Karaoke data and CM data to the host apparatus through the ISDN channel. This can be performed periodically based upon a schedule of the Karaoke data distribution center. The received new Karaoke data is then reserved in the storage 31.

FIG. 5 is a block diagram of the management or control apparatus 3. The control apparatus 3 may be an apparatus like a cash register machine installed on the counter of the control room. In this apparatus, a main controller 40 is connected to an order detail table 41, an operation/display panel 42, an internal communication controller 43, a modem 44, a printer 45 and a cash register 46. The internal communication controller 43 contains a modem similar to that of the internal communication controller 32 to receive an order message sent from the Karaoke apparatus 4. The main controller 40 then searches the order detail table 41 according to the received order code and displays the searched details on the operation/display panel 42. The operation/display panel 42 is provided with various kinds of panel switches operated by the employee as well as a display. When the employee operates to turn on a panel switch corresponding to the order details on the display, then the main controller 40 produces an answer message corresponding to the order details and transmits the produced message to the corresponding communication Karaoke apparatus through the internal communication controller 43. If the answer message indicates that the order has been accepted, a charge for the order will be counted to the corresponding Karaoke Box at the same time. If the received order code is a request for purchase of a concert ticket, the main controller 40 connects the modem 44 to an on-line ticket selling center, reserves a seat, and issues a ticket for the reserved seat by use of the printer 45. At settlement of accounts, the main controller 40 inputs to the cash register 46 the sum of charges for the corresponding Karaoke Box accumulatively stored therein and issues a receipt after payment by cash.

FIG. 6 and FIGS. 7A to 7C are flow charts showing operations of the Karaoke apparatus. These flow charts illustrate a code admission operation when a command has been inputted from the commander 5, a music data receiving operation when the music data has been received from the host apparatus 2, an answer message receiving operation when the answer message has been received from the control apparatus 3, and a music-playing end operation when service of the Karaoke music has been finished, respectively.

Figure 6:
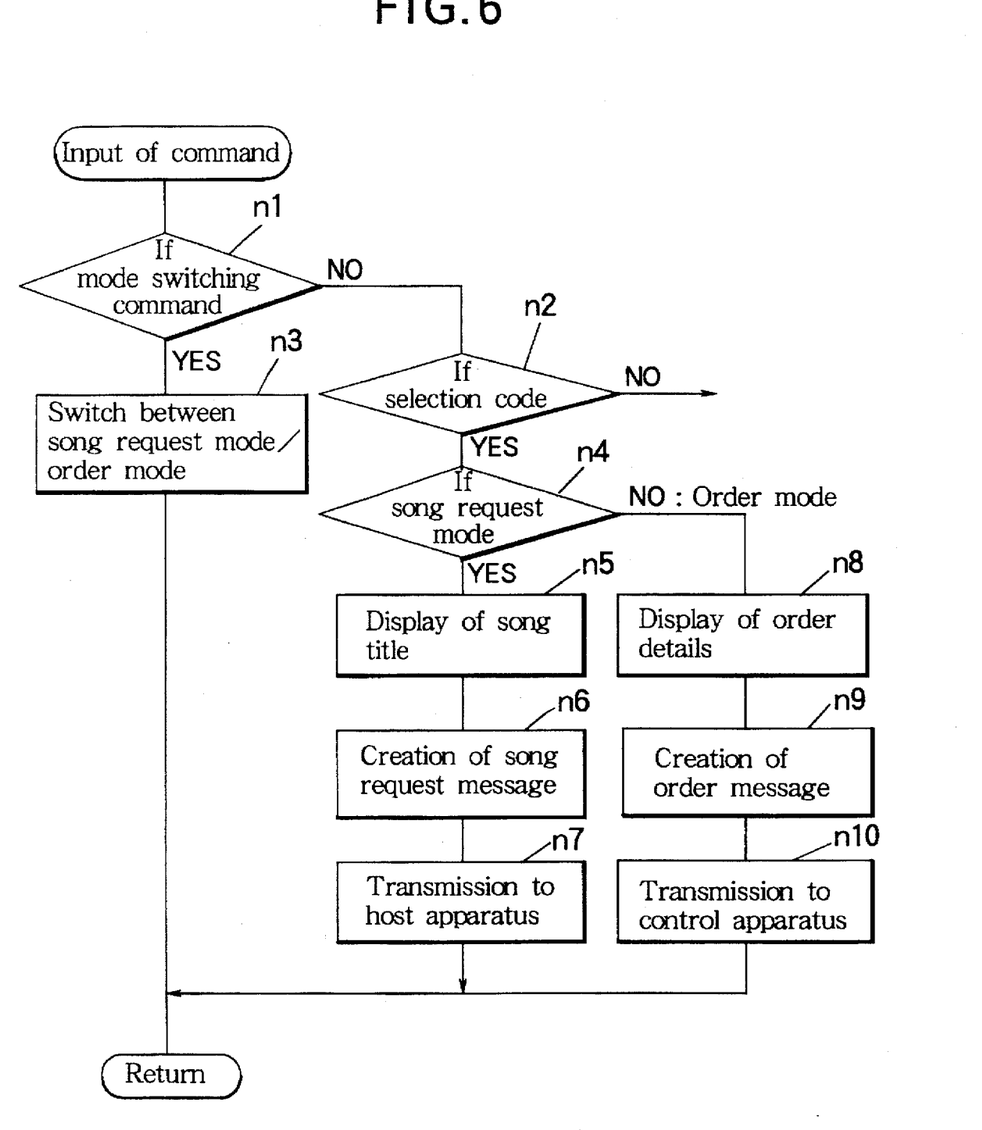
FIG. 6 is a flow chart showing an operation of the Karaoke apparatus.

FIG. 6 shows the code admission operation. In this operation, the Karaoke apparatus receives a signal from the commander 5 and then determines whether the signal indicates a mode switching command or a selection code (n1 and n2). If it is the mode switching command (n1), an old mode set at the Karaoke apparatus will be switched to another mode (n3). In this case, there is two modes, an entry mode and an order mode. In the entry mode or music selection mode, the selection code inputted to the Karaoke apparatus is treated as the entry code. In the order mode, it is treated as the order code.

If the selection code has been received (n2), then it is determined whether the Karaoke apparatus is currently in the music selection mode or not (n4). If the music selection mode, the title of a requested song is displayed on the monitor 28 (n5), while a song request message is created (n6) and the message is transmitted to the host apparatus 2 (n7). On the contrary, under the order mode, order details corresponding to the inputted order code are displayed (n8) and an order message including the order code is created (n9). The order message is then transmitted to the control apparatus 3 (n10).

Figure 7A:
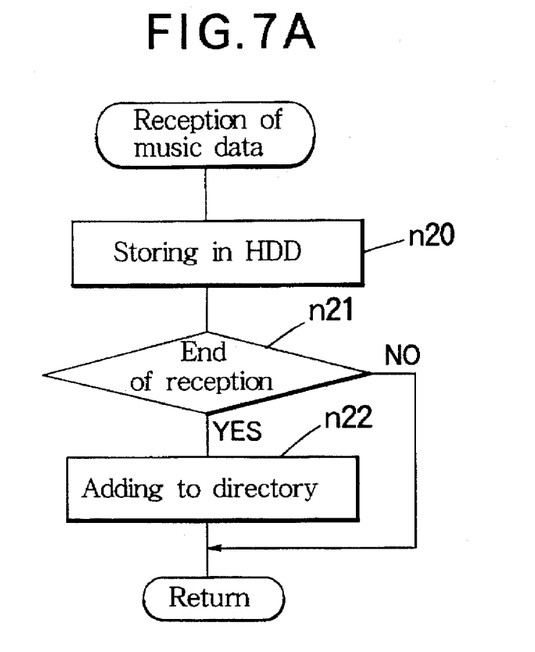
FIGS. 7A–7C are a flow chart showing other operations of the Karaoke apparatus.

FIG. 7A is a flow chart showing the operation when the music data has been received. At first, an electric signal (packet) including the music data is sent from the host apparatus 2 and is stored in a predetermined area of the HDD. This operation is performed repeatedly as the packet is received (n20). Next, it is determined if the reception of the music data has been ended (n21) and a song code of the music data is thus added to a directory of the HDD (n22).

Figure 7B:
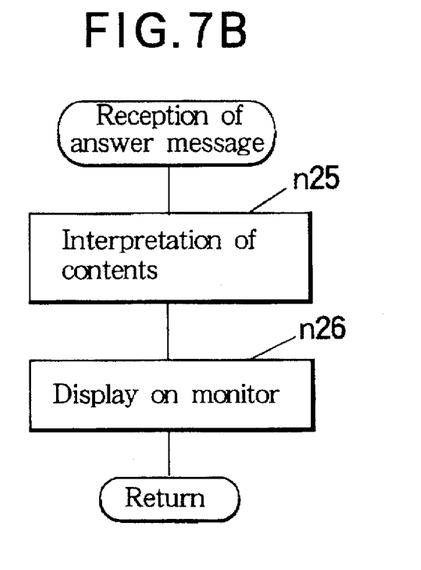

FIG. 7B is a flow chart showing the operation when the answer message has been received. When the answer message is received, contents of the message is interpreted (n25) to create character codes representing the contents. The character code is then fed to the character generator 23, and is displayed on the monitor 28 (n26).

Figure 7C:
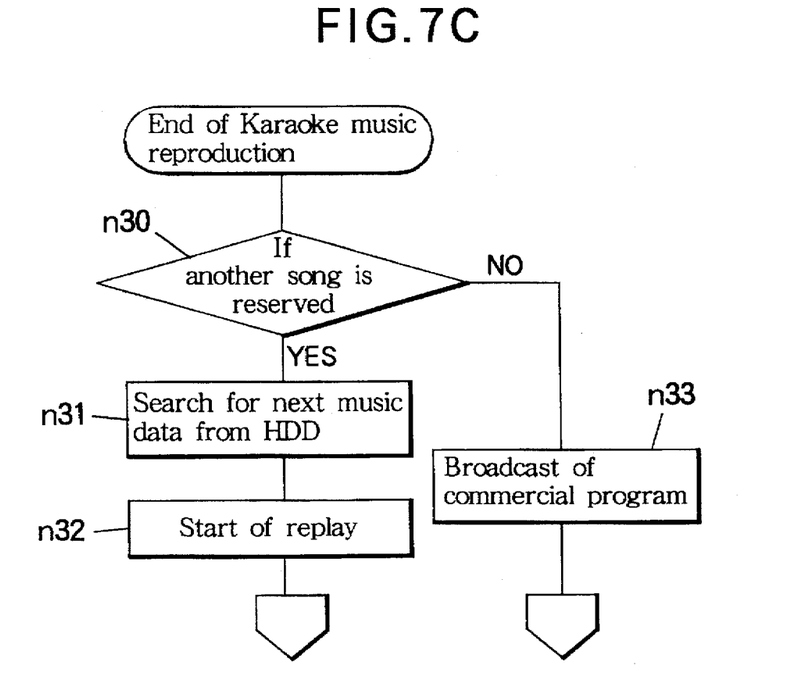

FIG. 7C is a flow chart showing the operation when the reproduction of the Karaoke music has been ended. Once the reproduction of the Karaoke music is ended, it is determined whether a next song is reserved or not (n30). If reserved, since the music data of the next song must have been already downloaded from the host apparatus 2 to the HDD 15 of the corresponding Karaoke apparatus, the HDD 15 will be searched for the next music data (n31), which is read out so as to start replay of the next Karaoke song (n32). If a next Karaoke song is not reserved yet, then a commercial message data will be read out from the HDD 15 so as to broadcast a commercial program (n33). Goods or events introduced in the commercial program include items available for an order in the order mode of the Karaoke apparatus, in which their order codes are displayed together with their introductions at the same time.

Figure 8A:
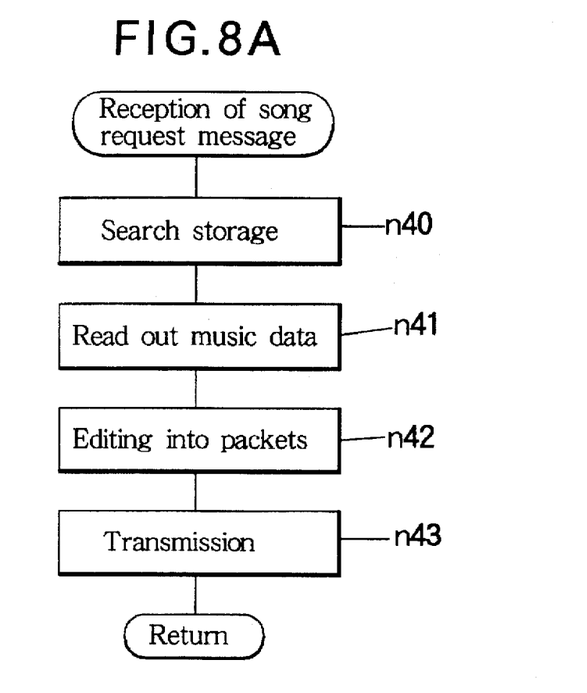
FIGS. 8A and 8B are a flow chart showing operations of the host apparatus.
Figure 8B:
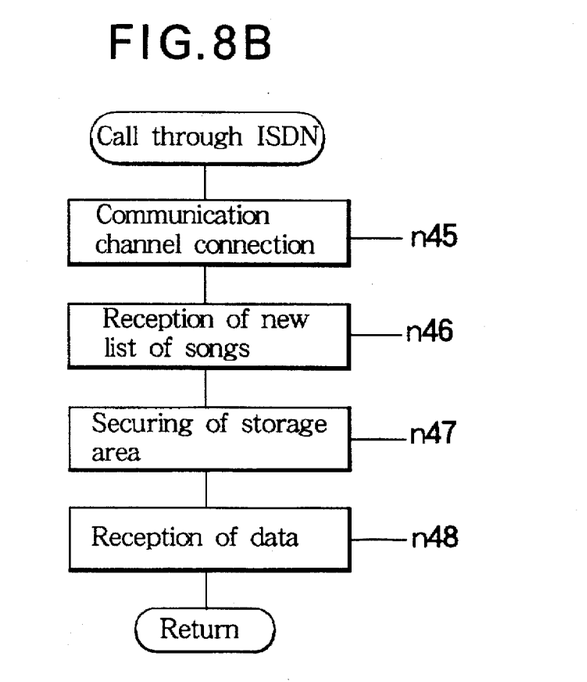

FIGS. 8A and 8B are a flow chart showing operations of the host apparatus. FIG. 8A shows an operation of the host apparatus when the song request message has been received. When receiving the message, the internal communication controller 32 extracts an entry code contained in the message and inputs it to the main controller 30. The main controller 30 then searches the storage 31 according to the entry code (n40). The searched music data is read out (n41), converted a block by block into packets (n42), and transmitted to the communication Karaoke apparatus from which the song request message has been sent (n43). This operation should be performed repeatedly until the all of the music data packets are completely sent to the corresponding Karaoke apparatus.

On the other hand, FIG. 8B shows another operation when music data and commercial message data are downloaded from the Karaoke data distribution center. The connection to the ISDN channel is established at the Karaoke data distribution center side so as to open the communication channel as soon as a call is made (n45). A list of songs newly distributed from the center is received at the host apparatus 2 (n46). The host apparatus secures a storage area inside the storage 31 thereof for storing the new music data and additional commercial message data (n47). After that, the music data and commercial message data are received from the distribution center (n48).

Figure 9:
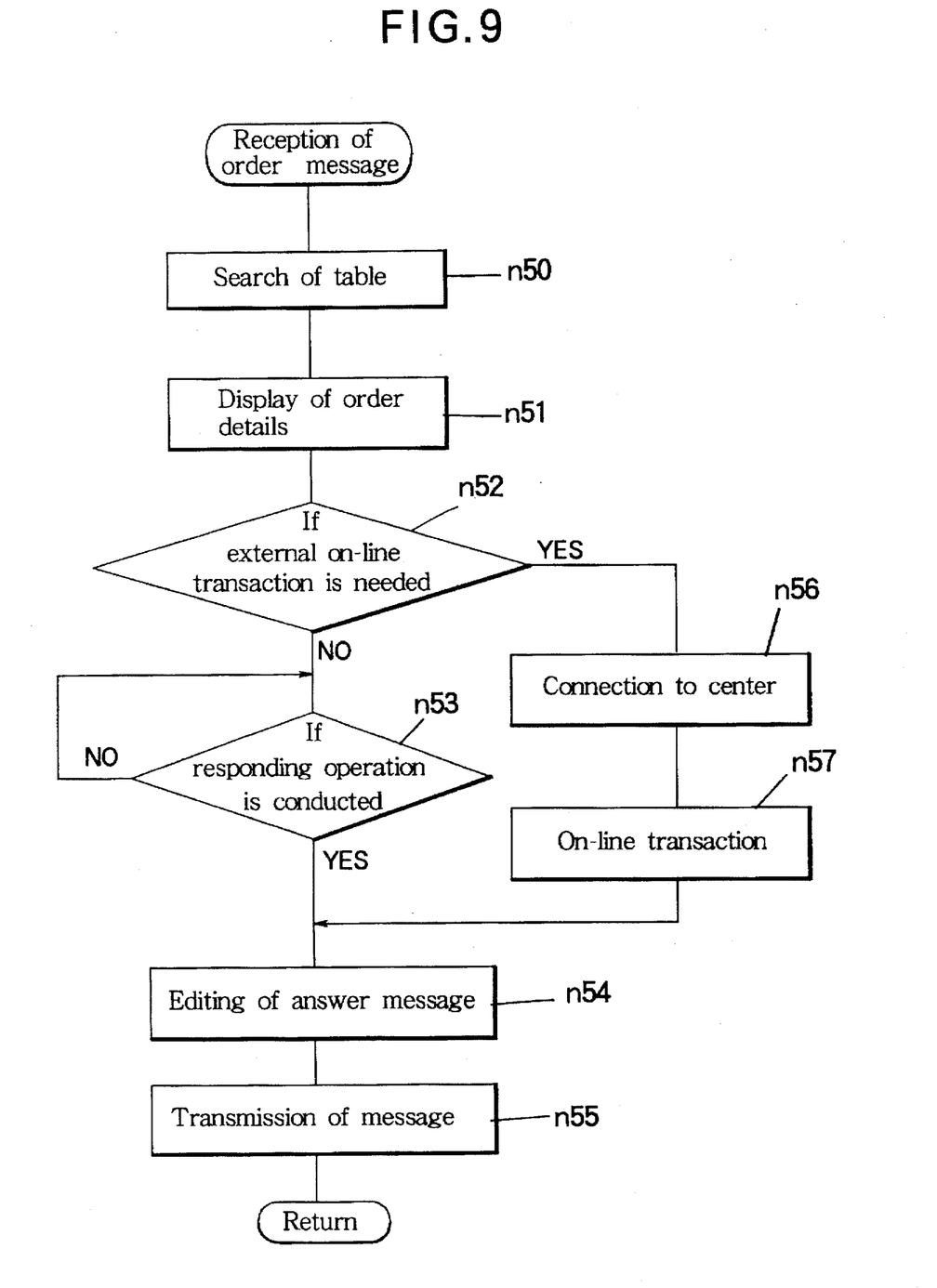
FIG. 9 is a flow chart showing an operation of the management apparatus.

Next, FIG. 9 is a flow chart showing the operation when the control apparatus 3 has received an order message from the Karaoke apparatus 4. When receiving the order message, the internal communication controller 43 inputs an order code contained in the message to the main controller 40. The main controller 40 then searches the order detail table 41 according to the order code (n50). The searched order details are displayed on the screen of the operation/display panel 42 (n51). Then, it is determined whether the order needs an external on-line transaction or not (n52). If not, the sequence will wait until the employee operates the control apparatus 3 so as to create an answer. Once the employee turns on the answer operation switch, an answer message corresponding to the operation details is edited (n54), and is sent to the Karaoke apparatus (n55). On the contrary, if the order needs the on-line transaction, such as purchasing of a concert ticket, a public telephone line will be connected to an on-line ticket selling center so as to purchase the ticket (n56). Then, the control apparatus communicates with the center by on-line for making a seat-reservation or the like (n57). The transaction process of, for example, making a seat reservation may be performed by the control apparatus 3 itself, or by the Karaoke apparatus from which the order has been transmitted, i.e., by communicating with the user. As apparent from the above operation described, the customer can select the Karaoke song by operating the commander 5 of the Karaoke apparatus 4 as well as can order some drink and food, or can buy a ticket.

In the above embodiments, the entry mode and the order mode are discriminated therebetween such that the entry mode is allowed only to select the Karaoke song, and the order mode is allowed only to order goods, and this makes it possible to use the common code system between the entry and order modes as well as to prevent taking the order for the song request by operational mistake. The present invention, however, is not limited to the above embodiments and may be modified such that both the song request and the service order can be performed in a single mode so as to simplify the operation.

Also, in the above embodiments, though the background video is reproduced by the LD changer 24 provided at the Karaoke apparatus 4, the host apparatus 2 may transmit the video to the Karaoke apparatus 4 in real time through the coaxial cable 6 using a CATV channel. If motion picture data can be transmitted in a short time by image data compression such as MPEG, then the motion picture data may be directly transmitted from the host apparatus 2 to the Karaoke apparatus 4 as well as the music data prior to the service of the Karaoke music.

Furthermore, the details of the answer message displayed on the monitor 28 may be erased automatically after a predetermined time, for example, by operating the commander 5 after the customer has checked the message.

As described above, according to the present invention, the music data is downloaded when the entry code has been issued by the input means, while the order message is transmitted to the control apparatus when the order code has been issued by the input means, and this make it possible not only to request a desired Karaoke song performed by the Karaoke apparatus, but also to do business, such as to order some drink and food or to buy goods, thus achieving efficient use of the communication line.

What is claimed is:

1. A Karaoke apparatus coupled to a host apparatus and a management apparatus through a communication line, the Karaoke apparatus comprising:

a circuit for inputting an entry code to request a Karaoke service of a desired song, and for inputing an order code to request an additional service other than the Karaoke service;

a transmitter for transmitting a signal representative of the inputted entry code to the host apparatus through the communication line so that the host apparatus supplies data representative of the desired song, and for transmitting a signal representative of the inputted order code to the management apparatus through the same communication line so that the management apparatus returns a response message and records the request represented by the order code;

a receiver for receiving the data representative of the desired song and the response message through the same communication line;

a circuit for reproducing the desired song according to the received data representative of the desired song to thereby provide the Karaoke service; and a display for displaying the received response message to thereby indicate a status of the request represented by the order code.

2. A Karaoke apparatus according to claim 1, wherein the circuit for inputting provides for inputting an order code for ordering an additional service of food or drink which can be served as supplement to the Karaoke service.

3. A Karaoke apparatus according to claim 1, wherein the circuit for inputting includes a manual tool switchable between allowing inputting of a user specified entry code and a user specified order code.

4. A Karaoke apparatus according to claim 1, wherein the display includes a circuit for receiving and displaying a commercial message indicating available items for the additional service order which is supplied by the host apparatus.

5. A system comprising a Karaoke apparatus, a host apparatus and a management apparatus, the Karaoke apparatus, host apparatus, and management apparatus being intercoupled through a communication line, wherein:

the host apparatus comprises a receiver for receiving a signal representative of an entry code requesting a Karaoke service of a desired song transmitted from the Karaoke apparatus through the communication line for supplying data representative of the desired song;

the management apparatus comprises:

a receiver for receiving a signal representative of an order code from the Karaoke apparatus through the communication line requesting an additional service other than the Karaoke service;

a transmitter for transmitting to the Karaoke apparatus a response message responding to the received request for the additional service; and a circuit for recording the request represented by the order code; and the Karaoke apparatus comprises:

a circuit for selectively inputting the entry code and for inputting the order code;

a transmitter for transmitting a signal representative of the inputted entry code to the host apparatus and transmitting a signal representative of the inputted order code to the management apparatus;

a receiver for receiving the data representative of the desired song from the host apparatus and receiving the response message from the management apparatus;

a circuit for reproducing the desired song according to the received data representative of the desired song to thereby provide the Karaoke service; and a display for displaying the received response message to thereby indicate a status of the service represented by the order code.

6. A system according to claim 5 the system further including a plurality of Karaoke apparatuses coupled to the host apparatus and the management apparatus to provide a local area network, wherein;

each Karaoke apparatus includes a circuit for sending data representative of a selected entry code to the host apparatus through the local area network, and the host apparatus includes a circuit for sending data representative of a selected desired song through the local area network to the Karaoke apparatus in response to receiving the data representative of the selected entry code; and each Karaoke apparatus includes a circuit for sending data representative of a selected order code to the management apparatus through the local area network, and the management apparatus includes a circuit for sending data representative of the response message to the Karaoke apparatus in response to receiving the data representative of the selected order code.

7. A method of transmitting data in an entertainment network, the entertainment network including at least one Karaoke apparatus, a host apparatus, a management apparatus, and a communication line coupling the Karaoke apparatus, the host apparatus, and the management apparatus, the method comprising:

selectively transmitting from the Karaoke apparatus to the communication line one of a signal representative of an entry code, the entry code representing a Karaoke service of a desired song, and a signal representative of an order code, the order code representing a request for an additional service other than the Karaoke service;

receiving the signal representative of the entry code at the host apparatus;

receiving the signal representative of the order code at the management apparatus;

transmitting a signal representative of a response message from the management apparatus to the Karaoke apparatus through the communication line in response to a receipt of the signal representative of the order code at the management apparatus;

recording the request represented by the received order code at the management apparatus; and receiving the signal representative of the response message at the Karaoke apparatus and displaying the received response message to indicate a status of the request represented by the order code.

8. The method of claim 7, the method further including selectively transmitting a signal representative of an order code, the order code representing a request for an additional service of food or drink.

9. The method of claim 7, the method further including selectively inputting one of a user specified entry code and a user specified order code from a manual tool at the Karaoke apparatus.

10. The method of claim 7, the method further including displaying a commercial message including available items for the additional order at the Karaoke apparatus in response to a signal from the host apparatus.

* * * * *

UNITED STATES PATENT AND TRADEMARK OFFICE
CERTIFICATE OF CORRECTION

PATENT NO. : 5,691,494
DATED : November 25, 1997
INVENTOR(S) : TSAI TOM JEN, KATO HIROKAZU It is certified that error appears in the above-indentified patent and that said Letters Patent is hereby corrected as shown below:

On the title page, item [75] under Inventors, the first Inventor's name "Tom Jen Sai" should read as follows: --Tom Jen Tsai--. Title page, item [19] should read --Tsai et al--.

Signed and Sealed this

Thirtieth Day of June, 1998

*Attest:*

BRUCE LEHMAN

*Attesting Officer*     *Commissioner of Patents and Trademarks*